United States Patent Office 3,401,147
Patented Sept. 10, 1968

3,401,147
EPOXY RESINS FROM BISPHENOLS OF 3,9-DI-VINYL SPIROBI (m-DIOXANES)
Samuel G. Smith, Jr., Hillsborough Township, Ralph F. Sellers, Somerset, and Allison S. Burhans, Millington, N.J., assignors to Union Carbide Corporation, a corporation of New York
No Drawing. Continuation-in-part of application Ser. No. 269,790, Apr. 1, 1963. This application Oct. 17, 1966, Ser. No. 586,931
9 Claims. (Cl. 260—47)

This is a continuation-in-part of Ser. No. 269,790, filed on Apr. 1, 1963 and now abandoned.

This invention relates to novel epoxy resins and more particularly to those derived from bisphenols of 3,9-divinyl spirobi (m-dioxanes).

Epoxy resins derived from bisphenol A, i.e., 2,2-bis(4-hydroxyphenyl)propane have found many useful applications when cured or hardened with appropriate curing agents. However, despite the many advantages of the prior art epoxy resins they are limited, where toughness, as demonstrated by high impact strength, for example is required.

It has now been discovered that cured epoxy resins derived from bisphenols of 3,9-divinyl spirobi (m-dioxane) have superior toughness as compared with bisphenol A epoxy resins.

The bisphenols of 3,9-divinyl spirobi (m-dioxane) have superior toughness as compared with bisphenol A epoxy resins.

The bisphenols of 3,9-divinyl spirobi (m-dioxane) have the structure

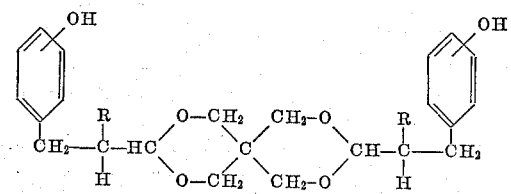

wherein R is hydrogen, alkyl having from 1 to 6 carbon atoms inclusive or halogen, i.e., a chloro, bromo, fluoro or iodo group.

The epoxy resins of the instant invention can be prepared by reacting the bisphenol of 3,9-divinyl spirobi (m-dioxane) with an epihalohydrin, preferably epichlorohydrin, in the presence of aqueous alkali metal hydroxide and an organic solvent such as an aliphatic alcohol and ketone.

The epoxy resins of the present invention have the general formula

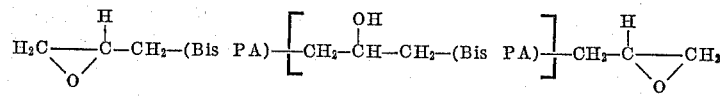

wherein $n$ has a value of 0 to 10 and preferably from 0 to 3 and "Bis PA" represents the structure

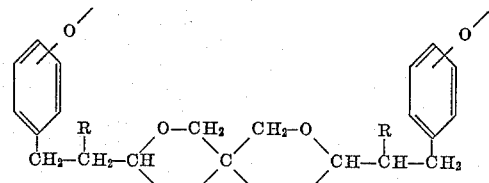

wherein R is as defined as above.

The preferred curing agents or hardeners for use with the epoxy resins of the present invention are 4,4'-methylene dianiline and metaphenylene diamine used in approximately stoichiometric amounts although other conventional hardeners can be used if desired. Examples of other suitable curing agents include primary and secondary amines such as ethylene diamine, diethylene triamine, α-methylbenzyl dimethylamine, tridimethyl amino methyl phenol, and the like; anhydrides such as hexahydrophthalic anhydride, pyromellitic anhydride, chlorendic anhydride and the like; and polyamides such as condensation polymers of dimerized and trimerized vegetable oil unsaturated fatty acids and aryl or alkyl polyamines and the like. Bisphenols of in the presence of acidic alkylation catalyst by the reaction of phenol with 3,9-divinyl spirobi (m-dioxane) on the presence of acidic alkylation catalyst by the method which includes the steps of forming a mixture of the phenol with from 0.01 to 10 percent by weight based on the total amount of phenol and 2,9-divinyl spirobi (m-dioxane) of a phosphoric acid catalyst, adding to the mixture incremental amounts of 3,9-divinyl spirobi (m-dioxane) up to a molar ratio of phenol to 3,9-divinyl spirobi (m-dioxane) of 2:1 and separating the bisphenol product.

The reaction proceeds as follows:

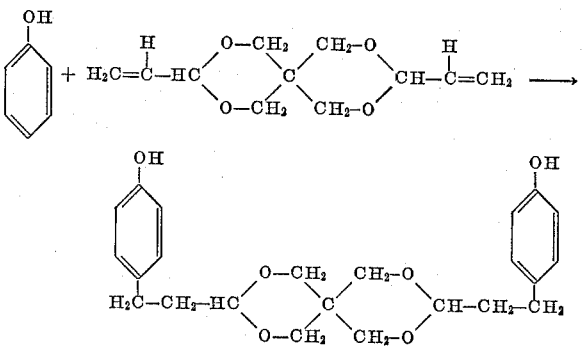

The point of attachment of the phenyl moieties can be either ortho or para to the phenolic hydroxyl. The bisphenol can have a cis or trans configuration. The point of attachment of the phenyl moiety to the 3,9-divinyl spirobi (m-dioxane) can be either on the β carbon atoms (as shown) or on the α carbon atoms. Although the skeletal structure may vary somewhat, the product obtained by the present method is definitely the bisphenol of 3,9-divinyl spirobi (m-dioxane) as indicated by close agreement of actual and theoretical values for molecular weight and hydroxyl content.

Acidic alkylation catalysts suitable for preparation of bisphenols of 3,9-divinyl spirobi (m-dioxane) include acidic ion exchange resins identified by such trademarks as Amberlite XE-100 (Rohm and Haas), Dowex 50-X-4 (Dow Chemical Co.) and the like, and acidic catalysts. The latter are exemplified but not limited by such compounds as phosphoric acid, citric acid, oxalic acid, sulfuric acid and the like.

The amount of acidic alkylation catalyst employed in the preparation of the bisphenol is not narrowly critical. Concentrations in the reaction mixture of 0.01 to 10 percent and preferably 0.4 to 2.0 percent by weight, based on the total weight of phenol and 3,9-divinyl spirobi (m-dioxane) present are generally employed.

By the term "phosphoric acid catalyst" is means phosphoric acid per se, i.e., orthophosphoric acid ($H_3PO_4$) as well as pyrophosphoric acid ($H_4P_2O_7$) and compounds which are capable of forming orthophosphoric acid such as phosphoric acid anhydride or phosphorus pentoxide ($P_2O_5$) and metaphosphoric acid ($HPO_3$). It is preferred that the acid be present in the reaction mixture in a relatively concentrated form, e.g., 85 percent phosphoric acid but the presence of greater amounts of water has not been observed to unduly interfere with the reaction. The use of 50 percent by weight and above aqueous solution of phosphoric acid is preferred. Mixtures of orthophosphoric acid and phosphorus pentoxide can also be used.

Phenols which can be alkylated with 3,9-divinyl spirobi (m-dioxane) to form the bisphenols thereof useful in this invention are hydroxy substituted aryl compounds having a replaceable hydrogen attached to a ring carbon atom in a position other than meta, i.e., either ortho or para to a phenolic hydroxyl. Thus the term "phenol" includes mono-nuclear, substituted and unsubstituted hydroxyaryl compounds. A "replaceable hydrogen" as the term is used in the present specification and claims is (1) a hydrogen which is attached to a carbon atom which is not impeded from reacting with 3,9-divinyl spirobi (m-dioxane) by the spatial arrangement of nearby atoms forming a part of the same molecule, i.e., is sterically unhindered and (2) is electronically unhindered, i.e., is not limited in activity by the presence, in other positions on the phenolic ring, of substituents tending to attract the ortho and para hydrogen more strongly to the phenolic ring, e.g., nitro groups. Among the phenols having replaceable hydrogens in the positions ortho and para to a phenolic hydroxyl, some of those deserving of special mention are: hydroxy substituted benzenes, e.g., phenol, catechol, pyrogallol, resorcinol, phloroglucinol, and unsymmetrical trihydroxy substituted benzenes; substituted phenols having in the meta positions, ortho positions or para position, providing at least one of the ortho position or the para position is unsubstituted, one or more ortho or para directing substituents such as alkyl groups, aryl groups, alkaryl groups, halogen groups, i.e., fluoro, chloro, bromo, and iodo, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guiacol, 4-ethylresorcinol, 5-methylresorcinol, 4-propylresorcinol, carvacrol, methylphenol, ethylphenol, butylphenol, octylphenol, dodecylphenol, eicosylphenol, tricontylphenol, and tetracontylphenol, 2,3-dimethylphenol, 2,4-dimethylphenol, 2-ethyl-4-propylphenol, 2,5-dimethylphenol, 2-ethyl-4-methylphenol, 2,4-diethylphenol, 2-methyl,4-butylphenol, 2-ethyl-5-methylphenol, 2-methyl-5-isopropylphenol, 2-propyl-5-methylphenol, 2-isopropyl-5-methylphenol, 2,6-dimethylphenol, 2-methyl-6-ethylphenol, 2,6-diethylphenol, 2-methyl-6-propylphenol, 3,4-dimethylphenol, 3-methyl-4-ethylphenol, 3,5-dimethylphenol, 3,5-diethylphenol, 2-chloro-4-methylphenol, 2-ethyl-4-chlorophenol, 3-chloro-3-methylphenol, 2,3,4-trimethylphenol, 2,3,5-trimethylphenol, 2,4-dimethyl-5-ethylphenol, 2-ethyl-4,5-dimethylphenol, 2,4-diethyl-5-methylphenol, 3,4,5-trimethylphenol and higher alkyl phenols.

In preparing the bisphenols, 3,9-divinyl spirobi (m-dioxane) is added to a mixture of the phenol and phosphoric acid catalyst. The ratio of phenol to 3,9-divinyl spirobi (m-dioxane) is not critical provided it is at least 2:1 but higher ratios such as 5:1 to 20:1 by weight, with 10:1 by weight being preferred, are ordinarily used.

The addition of 3,9-divinyl spirobi (m-dioxane) is incremental, i.e., dropwise. It has been found that heating a mixture containing all of both the phenol and 3,9-divinyl spirobi (m-dioxane) reactants produces resinous products having molecular weights over 1000. The reaction mixture, over the course of incremental addition, is held at an elevated temperature, e.g., 35° C. to 100° C. with pressure as necessary, and preferably at between 35 and 75° C. until reaction is substantially complete, usually several hours at the preferred temperatures.

Solvents can be used in the bisphenol forming reaction vessel if desired. Typical solvents are inert organic liquids such as hydrocarbons, ketones, and halogenated hydrocarbons.

The product can be isolated by means conventional in the art. The residue can be dissolved in a solvent such as methylethyl ketone or toluene and recrystallized, whereupon filtration then separates the bisphenol from the reaction mixture.

The invention is further defined by the examples which follow in which all parts and percentages are by weight unless otherwise specified.

EXAMPLE 1

To a five-liter three-necked flask equipped with mechanical stirrer, thermometer, reflux column and dropping funnel there was added 10 moles of phenol and 4.6 grams [0.4% based on phenol and 3,9-divinyl spirobi (m-dioxane)] of a phosphoric acid catalyst comprising $H_3PO_4 + P_2O_5$ for an equivalent of 105 percent $H_3PO_4$. With vigorous agitation the charge was cooled to 35–45° C. and one mole of 3,9-divinyl spirobi (m-dioxane) dissolved in toluene was added dropwise over a period of 120–150 minutes. During the addition, the reaction exotherm was controlled to maintain the temperature of the reaction mixture between 35 and 45° C. for an additional 18–22 hours. The reaction mass was neutralized to pH 5–6 by addition of a 50 percent aqueous solution of sodium hydroxide. The crude bisphenol of 3,9-divinyl spirobi (m-dioxane) was isolated by distillation to a final pot temperature of 290° C. at a pressure of 10 mm. Hg. The crude bisphenol which was the residue product was separated from the salts of neutralization by dissolution in methyl filtration and evaporation of the toluene. There was obtained a light colored semi-grindable material with 150° C. tripod flow of 35–36 seconds.

The 150° C. tripod flow test is a rapid method for checking product to product resin structural uniformity and is performed as follows:

A brass rod 4½" x ⅜" weighing 69.7 g. is placed vertically within a tripod-mounted tube, ⁷⁄₁₆" I.D. with the bottom of the rod resting on a cylindrical pellet of the test resin, ⅜" O.D. and ⅝" in length placed in the bottom of the tube. The tripod is mounted on a hot plate held at 150° C. with the bottom of the pellet contiguous with the surface of the hot plate, and the bottom of the tube elevated ⁵⁄₃₂" above the hot plate surface. As the resin pellet melts and flows out, the brass rod resting on it drops. The time in seconds required for the brass rod to drop ½" is recorded as the tripod flow time.

EXAMPLES 2–5

Bisphenol products having essentially the same properties were obtained by repeating Example 1 with the exception that the phosphoric acid catalyst was replaced by dried Dowex-50-X-4, citric acid, oxalic acid or sulfuric acid.

EXAMPLE 6

The Bisphenol prepared as in Example 1 was epoxidized by charging 640 g. of this product to a 3 liter 4-neck, round-bottom flask fitted with an agitator, thermometer, dropping funnel and a condenser which could be used either for reflux or distillation, together with 1184 g. of epichlorohydrin and 320 g. of ethanol. The charge was heated to reflux (86° C.) and then 180 g. of additional ethanol was added to the flask along with 145 g. of methylethyl ketone.

The temperature of the reactants was adjusted to 60–65° C. and 50% aqueous sodium hydroxide was added slowly through the dropping funnel according to the following schedule:

31 g. over a 60 minute period
31 g. over the next 30 minutes 217 g. over the next 60 minutes
31 g. over the next 60 minutes The dropping funnel was rinsed into the reaction flask with 25 g. of water and the charge was stirred for 20 minutes at 60–65° C.

The condenser was adapted for vacuum distillation, and unreacted epichlorohydrin, ethanol, methylethyl ketone and water distilled off over a period of 1.75 hours under a gradually diminishing pressure until the final conditions were 135° C. pot temperature at about 50 mm. Hg pressure.

The reactor residue was dissolved in 960 g. of methylisobutyl ketone and washed with 96% of hot water which dissolved salts and residual alkali.

The washed residue was transferred to a liter separatory funnel and the aqueous wash layer removed. The organic layer (epoxy resin solution) was washed twice more with 960 g. portions of hot water. The pH of the third wash was 6.0.

The solvent was removed from the epoxy resin solution by vacuum distillation.

Live steam was bubbled through the molten epoxy resin at 135–140° C. under a pressure of 25–50 mm. Hg for 15 minutes. Then residual water was removed by vacuum distillation. The epoxy resin of the bisphenol of 3,9-divinyl spirobi (m-dioxane) cooled to a solid mass at room temperature having an epoxy assay of 339 grams/gram equivalent.

This product when cured with a stoichiometric amount of 4,4'-methylene dianiline at 80° C. for 3–4 hours followed by heating at 160° C. for 4 hours afforded a casting having the following physical properties.

Izod impact strength (ASTM D–256–56)
ft./lbs./in__ 1.34
Tensile modulus (ASTM D–638–58T) __p.s.i__ 425,000
Tensile strength (ASTM D–638–58T)___p.s.i__ 11,400
Flexural modulus (ASTM D–790–58T)__p.s.i__ 462,000
Flexural strength (ASTM D–790–58T)__p.s.i__ 17,100

Control A

A commercial epoxy resin based on bisphenol A having an epoxy assay of 192 g./g. equivalent was cured with a stoichiometric amount of 4,4'-methylene dianiline at 80° C. for 3–4 hours followed by heating at 160° C. for 4 hours as a Control for comparison with the cured epoxy product. The casting had the following properties:

Izod impact strength _____ft./lbs./in__ 0.31
Tensile modulus _____p.s.i__ 405,000
Tensile strength _____p.s.i__ 10,300
Flexural modulus _____p.s.i__ 418,000
Flexural strength _____p.s.i__ 16,000

EXAMPLE 7

The preparation of epoxy resin of the bisphenol of 3,9-divinyl spirobi (m-dioxane) described in Example 6 was repeated except that the product was further purified by distillation in a molecular still. This epoxy product having an epoxy of 262 g./g. equivalent, when cured with 4,4'-methylene dianiline, using the same curing conditions as those of Example 6 and Control A afforded a casting having the following properties:

Izod impact strength _____ft./lbs./in__ 1.50
Tensile modulus _____p.s.i__ 416,000
Tensile strength _____p.s.i__ 10,500
Flexural modulus _____p.s.i__ 499,000
Flexural strength _____p.s.i__ 18,900

EXAMPLE 8

An epoxy resin of the bisphenol of 3,9-divinyl spirobi (m-dioxane) prepared as described in Example 6 and having an epoxy assay of 330 g./g. equivalent was cured with metaphenylene diamine at 80° C. for 3–4 hours followed by heating at 160° C. for 4 hours. The resultant casting had the following properties:

Izod impact strength _____ft./lbs./in__ 0.54
Tensile modulus _____p.s.i__ 533,000
Tensile strength _____p.s.i__ 13,600
Flexural strength _____p.s.i__ 19,200

Control B

As a control B for comparison with the cured epoxy resin of Example 8 a commercial epoxy resin based on bisphenol A and having an epoxy assay of 183 g./g. equivalent was cured with metaphenylene diamine at 80° C. for 3–4 hours followed by heating at 160° C. for 4 hours. The casting had the following properties.

Izod impact strength _____ft./lbs./in__ 0.26
Tensile modulus _____p.s.i__ 458,000
Tensile strength _____p.s.i__ 12,900
Flexural strength _____p.s.i__ 16,400

It can be seen from the above examples and controls that the cured epoxy resin from the bisphenol of 3,9-divinyl spirobi (m-dioxane) have a surprisingly greater toughness than the conventional, commercially avaiable bisphenol A based epoxy resins. This unexpected improvement in toughness can be viewed as due to the replacement of the isopropylidene moiety of bisphenol A

by the 3,9-divinyl spirobi (m-dioxane) moiety.

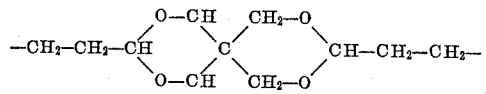

EXAMPLES 9–12

When the bisphenols of 3,9-divinyl spirobi (m-dioxane) prepared as in Examples 2–5 are epoxidized and cured as in Example 6 the resultant castings have comparable properties.

Although the invention has been described in its preferred forms with a certain degree of particularity, it is understood that the present disclosure has been made only by way of example, and that numerous changes can be made without departing from the spirit and scope of the invention.

What is claimed is:

1. The epoxy resin having the general formula

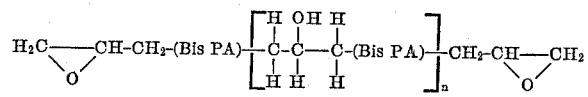

wherein *n* has a value of 0 to 10 and "Bis PA" represents the structure

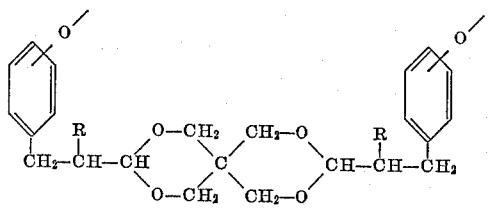

wherein R is selected from the group consisting of hydrogen, alkyl having from 1 to 6 carbon atoms and halogen.

2. The epoxy resin of claim 1 hardened with an approximately stoichiometric amount of an epoxy resin curing agent selected from the group consisting of primary amines, secondary amines, anhydrides, and polyamides.

3. The hardened epoxy resin of claim 2 wherein the curing agent is a primary amine.

4. The hardened epoxy resin of claim 3 wherein the curing agent is 4,4'-methylene dianiline.

5. The hardened epoxy resin of claim 3 wherein the curing agent is metaphenylene diamine.

6. The epoxy resin of claim 1 wherein $n$ has a value of 0 to 3.

7. The epoxy resin of claim 1 wherein $n$ has a value of 0.

8. The epoxy resin of claim 1 wherein R is hydrogen.

9. The epoxy resin of claim 1 wherein R is methyl.

References Cited
UNITED STATES PATENTS

| | | | |
|---|---|---|---|
| 2,841,595 | 7/1958 | Pezzaglia | 260—47 |
| 2,915,501 | 12/1959 | Guest et al. | 260—340.7 |
| 3,128,255 | 4/1964 | McGary et al. | 260—47 |

WILLIAM H. SHORT, *Primary Examiner.*

T. D. KERWIN, *Assistant Examiner.*